US012311565B2

(12) United States Patent
Su

(10) Patent No.: US 12,311,565 B2
(45) Date of Patent: May 27, 2025

(54) SCRAPER WITH COVER

(71) Applicant: HONG ANN TOOL INDUSTRIES CO., LTD., Taichung (TW)

(72) Inventor: Cheng-Wei Su, Taichung (TW)

(73) Assignee: HONG ANN TOOL INDUSTRIES CO., LTD., Taichung (TW)

( * ) Notice: Subject to any disclaimer, the term of this patent is extended or adjusted under 35 U.S.C. 154(b) by 92 days.

(21) Appl. No.: 18/457,391

(22) Filed: Aug. 29, 2023

(65) Prior Publication Data

US 2024/0208087 A1 Jun. 27, 2024

(30) Foreign Application Priority Data

Dec. 22, 2022 (TW) .................................. 111149441

(51) Int. Cl.
*B26B 5/00* (2006.01)
*A47L 13/08* (2006.01)

(52) U.S. Cl.
CPC .............. *B26B 5/006* (2013.01); *A47L 13/08* (2013.01)

(58) Field of Classification Search
CPC ......... B26B 5/006; B26B 5/005; A47L 13/08; A47L 13/02
See application file for complete search history.

(56) References Cited

U.S. PATENT DOCUMENTS

| | | | | | |
|---|---|---|---|---|---|
| 2,404,141 | A * | 7/1946 | Nelson | B26B 5/006 30/162 |
| 4,955,138 | A * | 9/1990 | Henke | A47L 13/08 30/169 |
| RE34,979 | E * | 6/1995 | Gringer | B44C 7/027 30/169 |
| 8,171,646 | B2 * | 5/2012 | Chiu | B26B 5/005 30/169 |
| 10,836,055 | B2 | 11/2020 | Su | |
| 11,872,714 | B1 * | 1/2024 | Chiu | B26B 5/006 |
| 2002/0104182 | A1 | 8/2002 | Panfili et al. | |
| 2019/0134831 | A1 * | 5/2019 | Chiu | A47L 13/08 |
| 2020/0108515 | A1 * | 4/2020 | Scimone | A47L 13/08 |

FOREIGN PATENT DOCUMENTS

CN 201567761 U 9/2010

* cited by examiner

*Primary Examiner* — Omar Flores Sanchez
(74) *Attorney, Agent, or Firm* — Muncy, Geissler, Olds & Lowe, P.C.

(57) ABSTRACT

A scraper includes a cover, a first clamping member, a second clamping member, and a locking device. The cover has a connection portion and an insertion protrusion. The first clamping member has a first through groove, and the second clamping member has a second through groove. The locking device has a sliding portion slidably arranged in the first through groove and the second through groove. The connection portion of the cover is detachably connected to the side of the first clamping member opposite to the second clamping member, and the insertion protrusion inserts through the first through groove and the second through groove and is detachably coupled with the second clamping member.

7 Claims, 6 Drawing Sheets

SCRAPER WITH COVER

BACKGROUND OF THE INVENTION

The present invention relates to a scraper and its cover.

U.S. Pat. No. 10,836,055 discloses a scraper, which includes a body having a handle portion, a first clamping portion, a second clamping portion, and a blade removably mounted between the first clamping portion and the second clamping portion. Further, a cap is detachably coupled to the first clamping portion and the second clamping portion to selectively cover the blade. However, the cap of the scraper is only coupled to the body through a simple concave-convex fittingstructure that may detached due to impact, resulting in an unsecure connection.

SUMMARY OF THE INVENTION

An objective of the present invention is to provide a scraper that includes a cover, a first clamping member, a second clamping member, and a locking device. The cover has a connection portion and an insertion protrusion. The first clamping member has a first clamping portion, a first connecting portion, and a first through groove disposed between the first clamping portion and the first connecting portion. The second clamping member has a second clamping portion, a second connecting portion, and a second through groove disposed between the second clamping portion and the second connecting portion. The second connecting portion is pivotally connected to the first connecting portion. The locking device has a first abutting portion abutting against a side of the first clamping member opposite to the second clamping member, a second abutting portion abutting against a side of the second clamping member opposite to the first clamping member, and a sliding portion having an end connected to the first abutting portion and another end connected to the second abutting portion. The sliding portion is slidably arranged in the first through groove and the second through groove. The connection portion of the cover is detachably connected to the side of the first clamping member opposite to the second clamping member. The insertion protrusion inserts through the first through groove and the second through groove and is detachably coupled with the second clamping member.

In an embodiment, the insertion protrusion includes an insertion section and a hook section. The insertion section is flexible and connected to the connection portion. The hook section extends from the insertion section and is detachably coupled with the second clamping member.

In an embodiment, the cover has a back portion opposite to the connection portion, and at least one clamping arm including a curved section and a clamping section. The curved section is flexible and connected to the back portion. The clamping section is connected to an end of the curved section opposite to the back portion. A blade storage compartment is formed between the back portion and the clamping section.

In an embodiment, the cover defines a front end and a rear end. The numbers of the at least one clamping arm is two, and each of the two clamping arms is disposed between the front end and the rear end. The clamping sections of the two clamping arms are parallel to each other and extend towards the front end.

In an embodiment, the cover further defines a left side and a right side. The back portion is provided with two lateral limiting protrusions respectively extending opposite to the connection portion and disposed adjacent to the left side and the right side.

In an embodiment, the connection portion is provided with a front limiting protrusion extending opposite to the back portion and disposed adjacent to the front end. The front limiting protrusion is connected to a front reverse hook extending from one end of the front limiting protrusion and towards the rear end.

In an embodiment, the two clamping arms, the two lateral limiting protrusions, the insertion protrusion and the front limiting protrusion are integrally formed in the cover as a monolithic structure. The two lateral limiting protrusions is flexible to change a distance between each other.

The present invention will become clearer in light of the following detailed description of illustrative embodiments of this invention described in connection with the drawings.

DETAILED DESCRIPTION OF THE INVENTION

Figure 1:
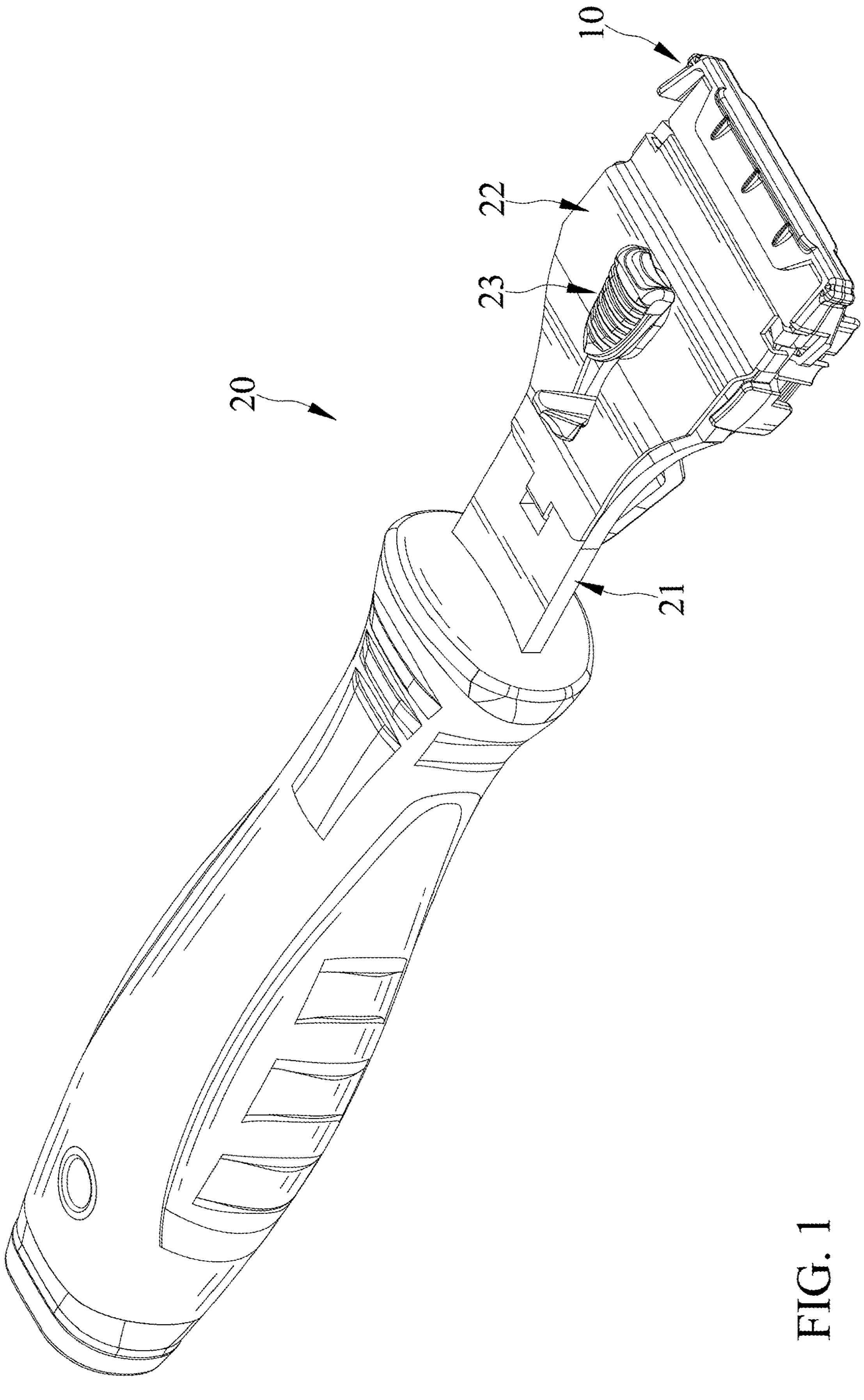
FIG. 1 is a perspective view of a scraper of an embodiment according to the present invention.
Figure 2:
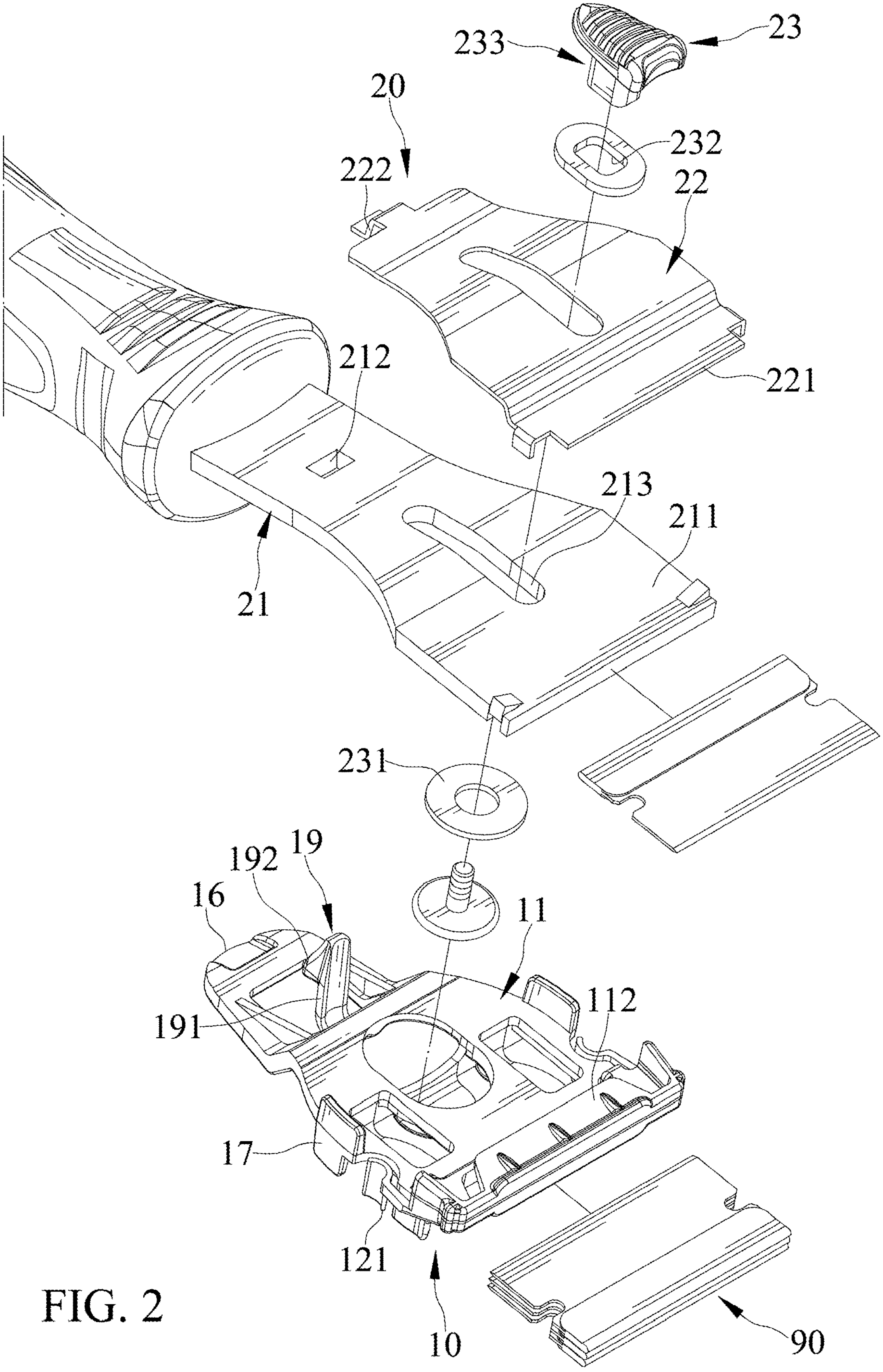
FIG. 2 is an exploded perspective view of the scraper of FIG. 1.
Figure 3:
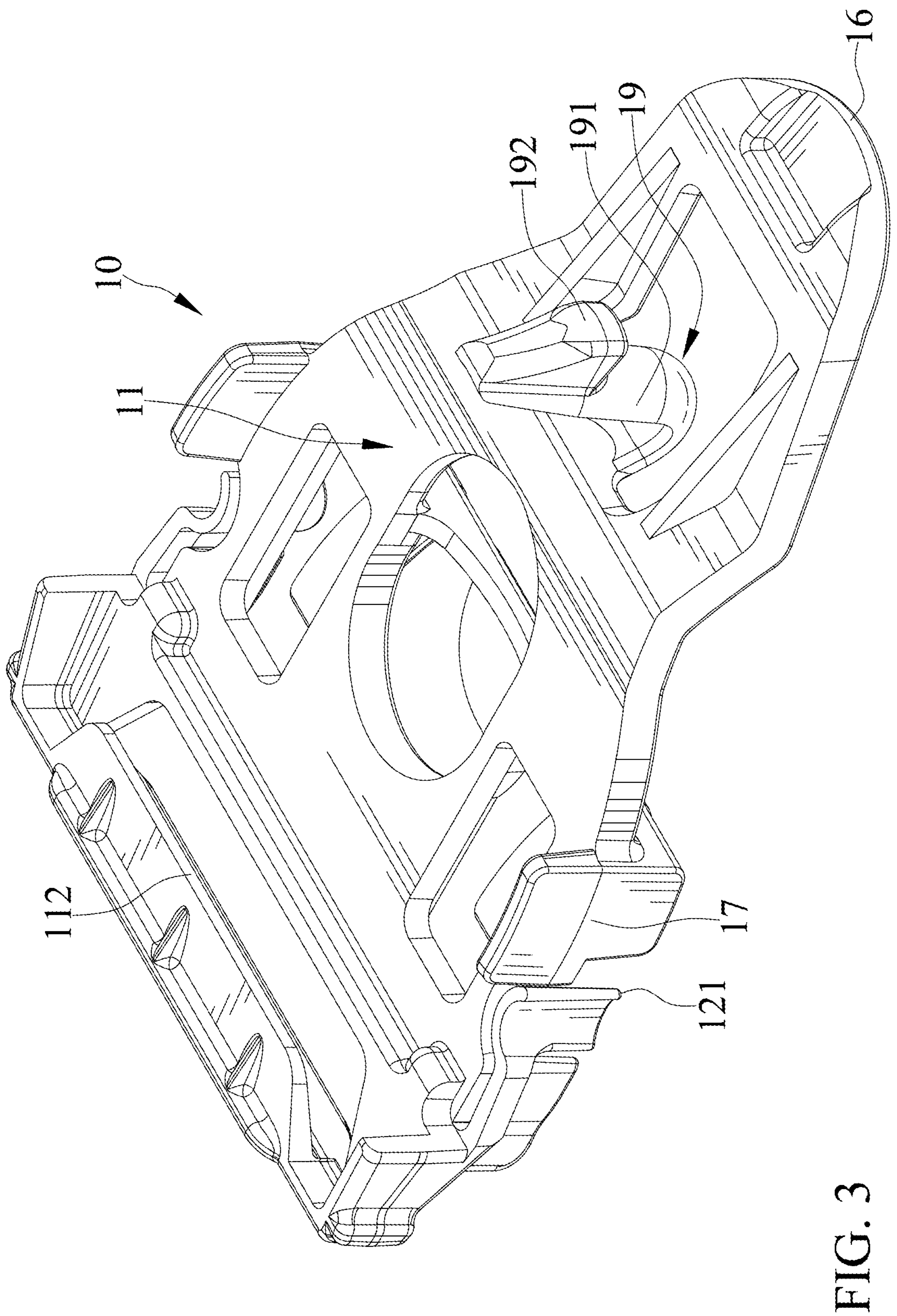
FIG. 3 is a perspective view of the cover of the scraper of FIG. 1.
Figure 4:
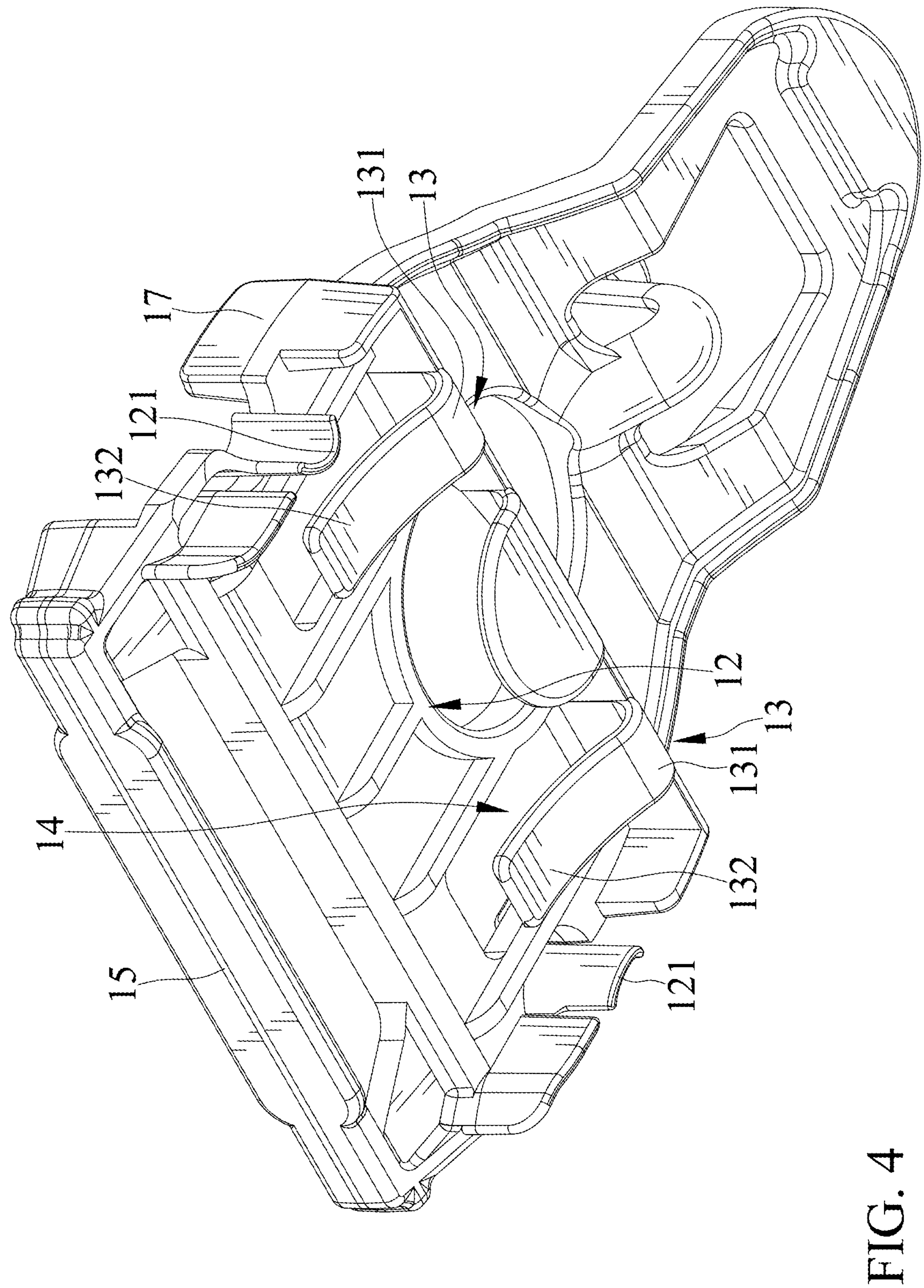
FIG. 4 is another perspective view of the cover of the scraper of FIG. 1.
Figure 5:
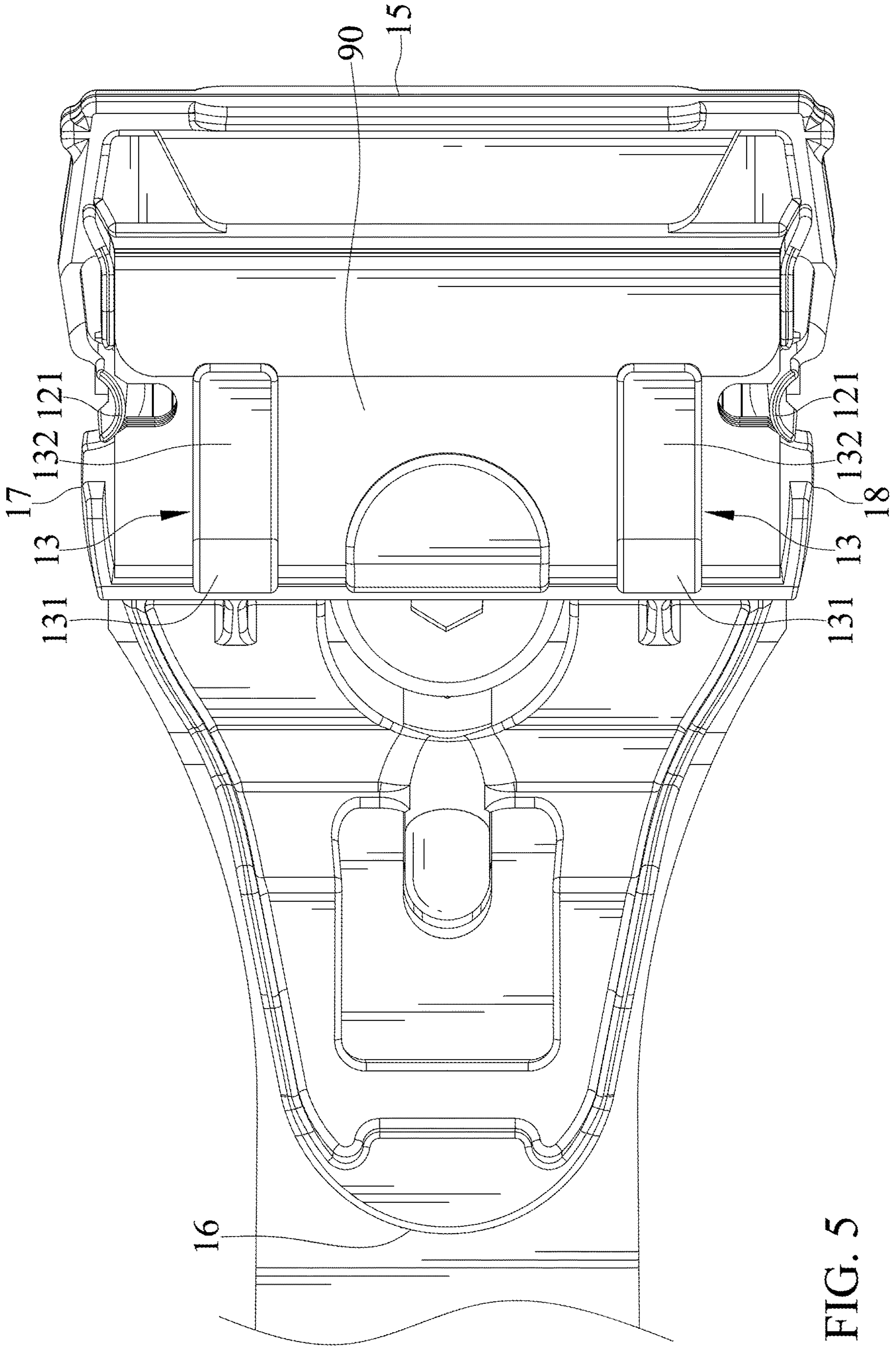
FIG. 5 is a partial top view of the scraper of FIG. 1.
Figure 6:
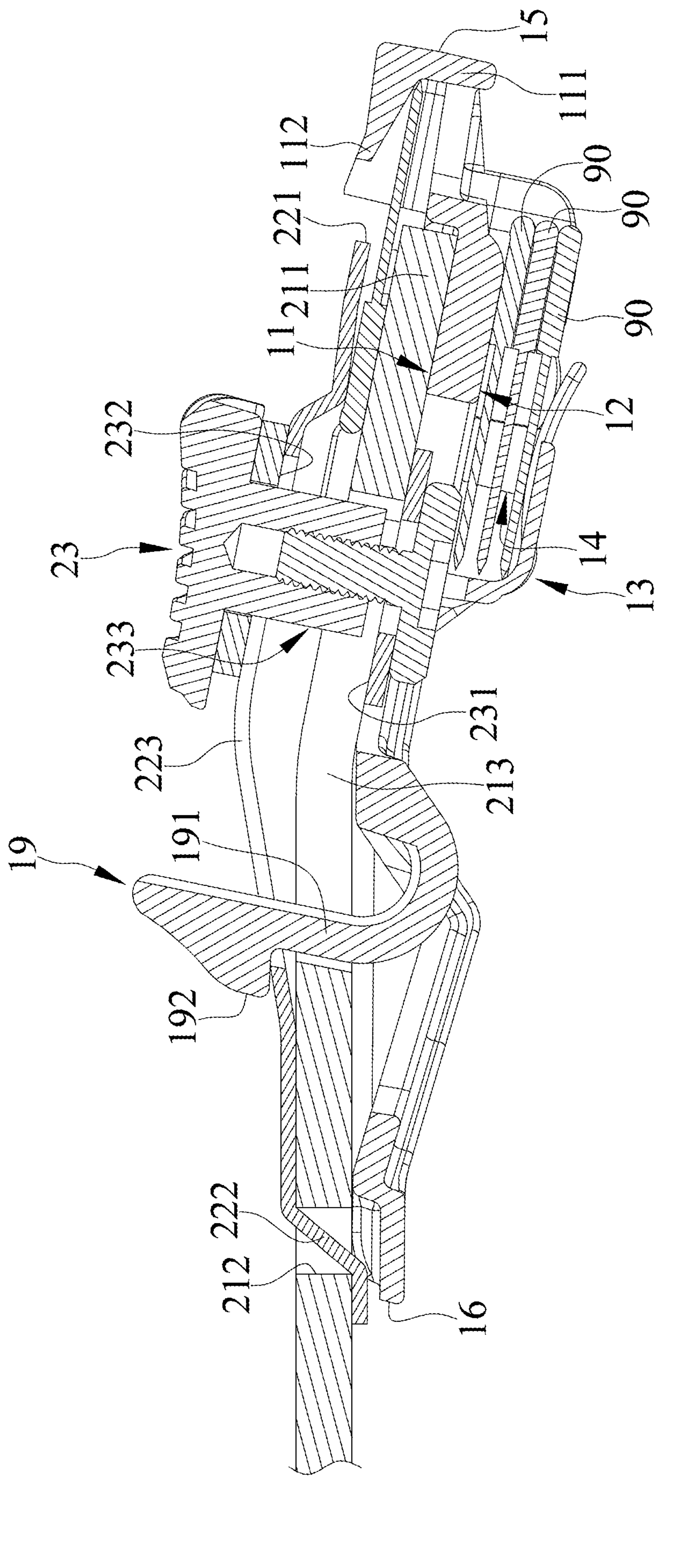
FIG. 6 is a cross sectional view of the scraper of FIG. 1.

FIGS. 1-6 show a scraper of an embodiment according to the present invention. The scraper 20 includes a cover 10, a first clamping member 21, a second clamping member 22, and a locking device 23. The cover 10 has a connection portion 11 and an insertion protrusion 19. The first clamping member 21 has a first clamping portion 211, a first connecting portion 212, and a first through groove 213 disposed between the first clamping portion 211 and the first connecting portion 212. The second clamping member 22 has a second clamping portion 221, a second connecting portion 222, and a second through groove 223 disposed between the second clamping portion 221 and the second connecting portion 222. The second connecting portion 222 is pivotally connected to the first connecting portion 212. The locking device 23 has a first abutting portion 231 abutting against a side of the first clamping member 21 opposite to the second clamping member 22, a second abutting portion 232 abutting against a side of the second clamping member 22 opposite to the first clamping member 21, and a sliding portion 233 having an end connected to the first abutting portion 231 and another end connected to the second abutting portion 232. The sliding portion 233 is slidably arranged in the first through groove 213 and the second through groove 223. The connection portion 11 of the cover 10 is detachably connected to the side of the first clamping member 21 opposite to the second clamping member 22. The insertion protrusion 19 inserts through the first through groove 213 and the second through groove 223 and is detachably coupled with the second clamping member 22. Thus, the cover 10 can be detachably attach to the first clamping member 21 and the second clamping member 22.

Further, the insertion protrusion 19 includes an insertion section 191 and a hook section 192. The insertion section 191 is flexible and connected to the connection portion 11. The hook section 192 extends from the insertion section 191 and is detachably coupled with the second clamping member 22.

In the embodiment, the cover 10 has a back portion 12 opposite to the connection portion 11, and at least one clamping arm 13 including a curved section 131 and a clamping section 132. The curved section 131 is flexible and connected to the back portion 12. The clamping section 132 is connected to an end of the curved section 131 opposite to the back portion 12. Thus, a blade storage compartment 14 may be formed between the back portion 12 and the clamping section 132 for receiving blades 90.

Furthermore, the cover 10 defines a front end 15 and a rear end 16. The numbers of the at least one clamping arm 13 is two, and each of the two clamping arms 13 is disposed between the front end 15 and the rear end 16. The clamping sections 132 of the two clamping arms 13 are parallel to each other and extend towards the front end 15 to hold the blades 90 in the blade storage compartment 14.

The cover 10 further defines a left side 17 and a right side 18. The back portion 12 is provided with two lateral limiting protrusions 121 respectively extending opposite to the connection portion 11 and disposed adjacent to the left side 17 and the right side 18.

The connection portion 11 is provided with a front limiting protrusion 111 extending opposite to the back portion 12 and disposed adjacent to the front end 15. The front limiting protrusion 111 is connected to a front reverse hook 112 extending from one end of the front limiting protrusion 111 and towards the rear end 16 to limit the blade 90 hold between the first clamping member 21 and the second clamping member 22.

Additionally, the two clamping arms 13, the two lateral limiting protrusions 121, the insertion protrusion 19 and the front limiting protrusion 111 are integrally formed in the cover 10 as a monolithic structure. The two lateral limiting protrusions 121 is flexible to change a distance between each other.

In summary, the cover 10 can securely detachably attach to the first clamping member 21 and the second clamping member 22, providing the function of covering the blade 90 and accommodating the blades 90. The clamping section 132 can hold the blades 90 firmly, while the design of the curved section 131 allows the clamping section 132 to change its position flexibly according to the quantity of blades 90. The user can freely place blades 90 in the blade storage compartment 14, even below the predetermined quantity. The two lateral limiting protrusions 121 can engage with side slots of the blades 90, enhancing the effectiveness of securing the blades 90 with the cover 10.

Although specific embodiments have been illustrated and described, numerous modifications and variations are still possible without departing from the scope of the invention. The scope of the invention is limited by the accompanying claims.

The invention claimed is:

1. A scraper comprising:

a cover having a connection portion and an insertion protrusion;

a first clamping member having a first clamping portion, a first connecting portion, and a first through groove disposed between the first clamping portion and the first connecting portion;

a second clamping member having a second clamping portion, a second connecting portion, and a second through groove disposed between the second clamping portion and the second connecting portion, wherein the second connecting portion is pivotally connected to the first connecting portion; and a locking device having a first abutting portion abutting against a side of the first clamping member opposite to the second clamping member, a second abutting portion abutting against a side of the second clamping member opposite to the first clamping member, and a sliding portion having an end connected to the first abutting portion and another end connected to the second abutting portion, and wherein the sliding portion is slidably arranged in the first through groove and the second through groove;

wherein the connection portion of the cover is detachably connected to the side of the first clamping member opposite to the second clamping member, and wherein the insertion protrusion inserts through the first through groove and the second through groove and is detachably coupled with the second clamping member.

2. The scraper as claimed in claim 1, wherein the insertion protrusion includes an insertion section and a hook section, wherein the insertion section is flexible and connected to the connection portion, and wherein the hook section extends from the insertion section and is detachably coupled with the second clamping member.

3. The scraper as claimed in claim 2, wherein the cover has a back portion opposite to the connection portion, and at least one clamping arm including a curved section and a clamping section, wherein the curved section is flexible and connected to the back portion, wherein the clamping section is connected to an end of the curved section opposite to the back portion, and wherein a blade storage compartment is formed between the back portion and the clamping section.

4. The scraper as claimed in claim 3, wherein the cover defines a front end and a rear end, wherein the numbers of the at least one clamping arm is two, and each of the two clamping arms is disposed between the front end and the rear end, and wherein the clamping sections of the two clamping arms are parallel to each other and extend towards the front end.

5. The scraper as claimed in claim 4, wherein the cover further defines a left side and a right side, and wherein the back portion is provided with two lateral limiting protrusions respectively extending opposite to the connection portion and disposed adjacent to the left side and the right side.

6. The scraper as claimed in claim 4, wherein the connection portion is provided with a front limiting protrusion extending opposite to the back portion and disposed adjacent to the front end, and wherein the front limiting protrusion is connected to a front reverse hook extending from one end of the front limiting protrusion and towards the rear end.

7. The scraper as claimed in claim 6, wherein the two clamping arms, the two lateral limiting protrusions, the insertion protrusion and the front limiting protrusion are integrally formed in the cover as a monolithic structure, and wherein the two lateral limiting protrusions is flexible to change a distance between each other.

* * * * *